United States Patent [19]
Yamaguchi

[11] Patent Number: 5,479,563
[45] Date of Patent: Dec. 26, 1995

[54] BOUNDARY EXTRACTING SYSTEM FROM A SENTENCE

[75] Inventor: Yukiko Yamaguchi, Nagoya, Japan

[73] Assignee: Fujitsu Limited, Kawasaki, Japan

[21] Appl. No.: 174,629

[22] Filed: Dec. 28, 1993

Related U.S. Application Data

[63] Continuation of Ser. No. 756,624, Sep. 9, 1991, abandoned.

[30] Foreign Application Priority Data

Sep. 7, 1990 [JP] Japan .................................. 2-238562

[51] Int. Cl.$^6$ ..................................................... G10L 9/00
[52] U.S. Cl. ......................................... 395/2.41; 395/2.62
[58] Field of Search .................................. 395/2.41–2.62, 395/22; 381/41–45

[56] References Cited

U.S. PATENT DOCUMENTS

| | | | |
|---|---|---|---|
| 4,876,731 | 10/1989 | Loris et al. | 395/21 |
| 5,146,405 | 9/1992 | Church | 364/419 |
| 5,146,406 | 9/1992 | Jensen | 364/419 |
| 5,163,111 | 11/1992 | Baji et al. | 395/22 |

OTHER PUBLICATIONS

Jain et al., "Incremental parsing by modular recurrent connectionist networks," Advances is Neural Information Processing Systems, vol. 2, ed. D. S. Touretzky, publ. Morgan Kaufmann, Nov. 27, 1989, pp. 364–371.

Parisi et al., "Connectionist modeling of syntactic constraints on sentence processing," IEEE 1st conf. neural networks, pp. 507–512, vol. 2, 1987.

Gorin et al., "Adaptive acquisition of language", ICASSP 90 Proceedings, 1990.

*Primary Examiner*—Allen R. MacDonald
*Assistant Examiner*—Michelle Doerrler
*Attorney, Agent, or Firm*—Staas & Halsey

[57] ABSTRACT

The present invention extracts boundaries from a sentence with no need for linguistic knowledge or complicated grammatical rules. Upon extracting a clause/phrase boundary, words are classified according to part-of-speech numbers of words which form inputted sentence information. Then, an input pattern representing part-of-speech numbers of a target word is checked to determine whether a clause/phrase boundary exists before or after the target word; a plurality of words before and after the target words is then applied to a neural network. Among units in the output layer of the neural network, a unit having the output larger than a threshold is determined to refer to a clause/phrase boundary of the target word. Upon extracting a subject-predicate boundary, words are classified in word number, and an input pattern corresponding to a plurality of words are applied to the neural network. The neural network comprises output units for a subject and a predicate, and a boundary is extracted by an inputted pattern which changes the output of these units.

13 Claims, 21 Drawing Sheets

| A PART-OF-SPEECH NUMBER | A PART-OF-SPEECH SYMBOL | A PART-OF-SPEECH |
| --- | --- | --- |
| 0 | ADV | ADVERB |
| 1 | NOT | NOT |
| 2 | ADVP | ADVERB PARTICLE |
| 3 | DET | DETERMINER |
| 4 | N | NOUN |
| 5 | PRON | PRONOUN |
| 6 | PPRON | PERSONAL PRONOUN |
| 7 | NUM | NUMERAL |
| 8 | ADJ | ADJECTIVE |
| 9 | V | VERB |
| 10 | AUX | AUXILIARY VERB |
| 11 | BE | BE-VERB |
| 12 | DO | DO |
| 13 | HAVE | HAVE |
| 14 | PREP | PREPOSITION |
| 15 | TO | "TO" LEADING THE INFINITIVE |
| 16 | CJ | CONJUNCTION |
| 17 | INTJ | INTERJECTION |
| 18 | Z | SYMBOL |
| 19 | # | START/END OF SENTENCE |

Fig. 4

This is a book.
It was lucky you left when you did.
He seemed to be surprised at the news.

ENGLISH TEXT

Fig. 5A

% This # is % a book.
% It # was lucky /% you # left / when % you # did.
% He # seemed + to be surprised & at the news.

/:CLAUSE BOUNDARY(16)   %:NOUN PHRASE(8)   #:VERB PHRASE(4)
&:PREPOSITION PHRASE(2)   +:INFINITIVE PHRASE(1)

ENGLISH TEXT WITH VARIOUS BOUNDARIES FORMING THE SEMANTIC DELIMITATION

Fig. 5B

| | | | | | | |
|---|---|---|---|---|---|---|
| This | PRON | 8 | | 19 | 5 11 | 8 |
| is | BE | 4 | | 5 | 11 3 | 4 |
| a | DET | 8 | | 11 | 3 4 | 8 |
| book | N | | | 3 | 4 18 | 0 |
| | Z | 0 | | 4 | 18 19 | 0 |
| | | | | | | |
| It | PRON | 8 | | 19 | 6 11 | 8 |
| was | BE | 4 | | 6 | 11 8 | 4 |
| lucky | ADJ | 0 | | 11 | 8 6 | 0 |
| you | PPRON | 24 | | 8 | 6 9 | 24 |
| left | V | 4 | | 6 | 9 0 | 4 |
| when | ADV | 16 | | 9 | 0 6 | 16 |
| you | PPRON | 8 | | 0 | 6 12 | 8 |
| did | DO | 4 | | 6 | 12 18 | 4 |
| | Z | 0 | | 12 | 18 19 | 0 |
| | | | | | | |
| He | PPRON | 8 | | 19 | 6 9 | 8 |
| seemed | V | 4 | | 6 | 9 15 | 4 |
| to | TO | 1 | | 9 | 15 11 | 1 |
| be | BE | 0 | | 15 | 11 9 | 0 |
| surprised | V | 0 | | 11 | 9 14 | 0 |
| at | PREP | 2 | | 9 | 14 3 | 2 |
| the | DET | 0 | | 14 | 3 4 | 0 |
| news | N | 0 | | 3 | 4 18 | 0 |
| | Z | 0 | | 4 | 18 19 | 0 |

A PART-OF-SPEECH INFORMATION AND BOUNDARY INFORMATION

A PART-OF-SPEECH SET AND BOUNDARY INFORMATION

This is a book.
He seemed to be surprised at the news.
It is strange he should have said that.
I will ask when the train leaves.

INPUT ENGLISH TEXT

Fig. 9B

| TARGET WORD | A PART-OF -SPEECH | A PART-OF -SPEECH NUMBER |
|---|---|---|
| This | PRON | 5 |
| is | BE | 11 |
| a | DET | 3 |
| book | N | 4 |
|  | Z | 18 |
|  |  |  |
| He | PPRON | 6 |
| seemed | V | 9 |
| to | TO | 15 |
| be | BE | 11 |
| surprised | V | 9 |
| at | PREP | 14 |
| the | DET | 3 |
| news | N | 4 |
|  | Z | 18 |
|  |  |  |
| It | PRON | 6 |
| is | BE | 11 |
| strange | ADJ | 8 |
| he | PPRON | 6 |
| should | AUX | 10 |
| have | HAVE | 13 |
| said | V | 9 |
| that | PRON | 6 |
|  | Z | 18 |
|  |  |  |
| I | PPRON | 6 |
| will | AUX | 10 |
| ask | V | 9 |
| when | ADV | 0 |
| the | DET | 3 |
| train | N | 4 |
| leaves | V | 9 |
|  | Z | 18 |

RESULT OF SELECTING
A PART-OF-SPEECH

Fig. 9C

| THREE WORD LINK | | |
|---|---|---|
| 19 | 5 | 11 |
| 5 | 11 | 3 |
| 11 | 3 | 4 |
| 3 | 4 | 18 |
| 4 | 18 | 19 |
|  |  |  |
| 19 | 6 | 9 |
| 6 | 9 | 15 |
| 9 | 15 | 11 |
| 15 | 11 | 9 |
| 11 | 9 | 14 |
| 9 | 14 | 3 |
| 14 | 3 | 4 |
| 3 | 4 | 18 |
| 4 | 18 | 19 |
|  |  |  |
| 19 | 6 | 11 |
| 6 | 11 | 8 |
| 11 | 8 | 6 |
| 8 | 6 | 10 |
| 6 | 10 | 13 |
| 10 | 13 | 9 |
| 13 | 9 | 6 |
| 9 | 6 | 18 |
| 6 | 18 | 19 |
|  |  |  |
| 19 | 6 | 10 |
| 6 | 10 | 9 |
| 10 | 9 | 0 |
| 9 | 0 | 3 |
| 0 | 3 | 4 |
| 3 | 4 | 9 |
| 4 | 9 | 18 |
| 9 | 18 | 19 |

RESULT OF FORMING
THREE WORD LINK

Fig. 9D

% This # is % a book.
% He # seemed ÷ to be surprised & at the news.
% It # is strange /% he # shoud have said % that.
% I # will ask /when % the train # leaves.

/:CLAUSE BOUNDARY(16)  %:NOUN PHRASE(8)  #:VERB PHRASE(4)
&:PREPOSITION PHRASE(2)  ÷:INFINITIVE PHRASE(1)

OUTPUT RESULT

Fig. 14A

| WORD | WORD NUMBER |
|---|---|
| START/END OF SENTENCE | 0 |
| this | 1 |
| that | 2 |
| is | 3 |
| a | 4 |
| the | 5 |
| book | 6 |
| pencil | 7 |
| . | 8 |
| ? | 9 |

VOCABULARY SET

Fig. 14B

This is a book.

INPUT ENGLISH TEXT

Fig. 14C

| WORD | WORD NUMBER |
|------|-------------|
| this | 1 |
| is | 3 |
| a | 4 |
| book | 6 |
| . | 8 |

RESULT OF SELECTING
A PART-OF-SPEECH

Fig. 14D

FOUR-WORD LINK

```
6 8 0 0
4 6 8 0
3 4 6 8
1 3 4 6
0 1 3 4
```

RESULT OF FORMING
FOUR WORD LINK

Fig. 14E

This is a book.

OUTPUT RESULT

Fig. 14F

| | | | | | |
|---|---|---|---|---|---|
| 6 | 8 | 0 | ( book . # # ) | | 1 |
| 4 | 6 | 8 | 0 | ( a book . # ) | 1 |
| 3 | 4 | 6 | 8 | ( is a book . ) | 1 |
| 1 | 3 | 4 | 6 | ( This is a book ) | 1 |
| 0 | 1 | 3 | 4 | ( # This is a ) | 0 |

DIAGRAM OF THE RELATION BETWEEN INPUT TO THE NEURAL NETWORK AND OUTPUT FROM THE NEURAL NETWORK

Fig. 15B

|      | This | is | a | book |   |   |
|------|------|----|---|------|---|---|
| This | 0    | 1  | 3 | 5    | 2 |   |
| is   | 1    | 3  | 5 | 6    | 1 |   |
| a    | 3    | 5  | 6 | 0    | 0 |   |
| book | 5    | 6  | 0 | 0    | 0 |   |

Fig. 15A

| 0 | #     |
|---|-------|
| 1 | This  |
| 2 | That  |
| 3 | is    |
| 4 | the   |
| 5 | a     |
| 6 | book  |
| 7 | pencil|

BOUNDARY EXTRACTING SYSTEM FROM A SENTENCE

This application is a continuation of application Ser. No. 07/756,624, filed Sep. 9, 1991, now abandoned.

BACKGROUND OF THE INVENTION

The present invention relates to a natural language processing system and more particularly a boundary extracting system as a method for extracting the boundary of a clause or phrase or the boundary of a subject and its predicate as a breaking point for defining the meaning of a sentence or the pronunciation of its words.

Recently, with the development of voice-synthesizing techniques, a reading system and a voice-response system have been realized. However, ordinary systems can generate only mechanical sounds rather than a human voice; instead, reading and responses should be given in more natural-voice sounds.

To give natural-voice sounds, it is necessary to produce an intonation pattern which correctly represents the semantic delimitations of a sentence.

The boundary representing the semantic delimitations of a sentence can be extracted by describing the grammatical rules of a language, analyzing its syntax, and then extracting the boundaries from a syntax tree. This method is not widely used in synthesizing voice sound because, with this method, a whole sentence is considered a syntax tree. A more commonly used method in this field is to extract the boundaries within a sentence by syntax-analyzing a sentence from phrases; that is, by analyzing a sentence from smaller units.

In the method where a sentence is analyzed from smaller units to extract a phrase boundary, an inputted sentence is analyzed according to grammatical rules established by linguistic knowledge. Therefore, a great many grammatical rules must be established beforehand, and a sentence having an element that cannot be defined by such grammatical rules may not be outputted. Also, relative to languages which have not been widely studied, it is very difficult to establish systematic grammatical rules. Accordingly, there is a problem that extraction of a clause/phrase boundary in a sentence cannot be performed successfully.

THE SUMMARY OF THE INVENTION

An object of the present invention is to provide a boundary extracting system for a sentence to extract the boundaries of a clause or phrase or the boundaries of a subject and its predicate without requiring linguistic knowledge or complex grammar skills.

A feature of the present invention resides in an intra-sentence boundary extracting system for extracting various boundaries before or after a word which forms the sentence information. The said system includes an inputted word classifying means for classifying the words which form the input sentence information and a boundary position information output means where classification results from a plurality of words are applied from said inputted word classifying means and, for a plurality of said words, clause/phrase boundary position information is outputted.

BRIEF DESCRIPTION OF THE DRAWINGS

FIG. 1B shows a principle of the second invention;

FIG. 4 is a listing of the parts-of-speech number classification;

FIGS. 5B, 5C and 5D are examples of the learning data according to the first principle of the invention;

FIG. 9A–9D are diagrams of an embodiment for extracting a boundary of the clause and phrase according to the first principle of the invention;

FIGS. 14A–14D are diagrams of an embodiment for extracting a boundary of the subject and predicate according to the second principle of the invention; and FIGS. 15A and 15B are an explanatory view of the other embodiment for extracting the boundary of the subject and predicate according to the second principle of the invention.

DESCRIPTION OF THE PREFERRED EMBODIMENTS

Figure 1:
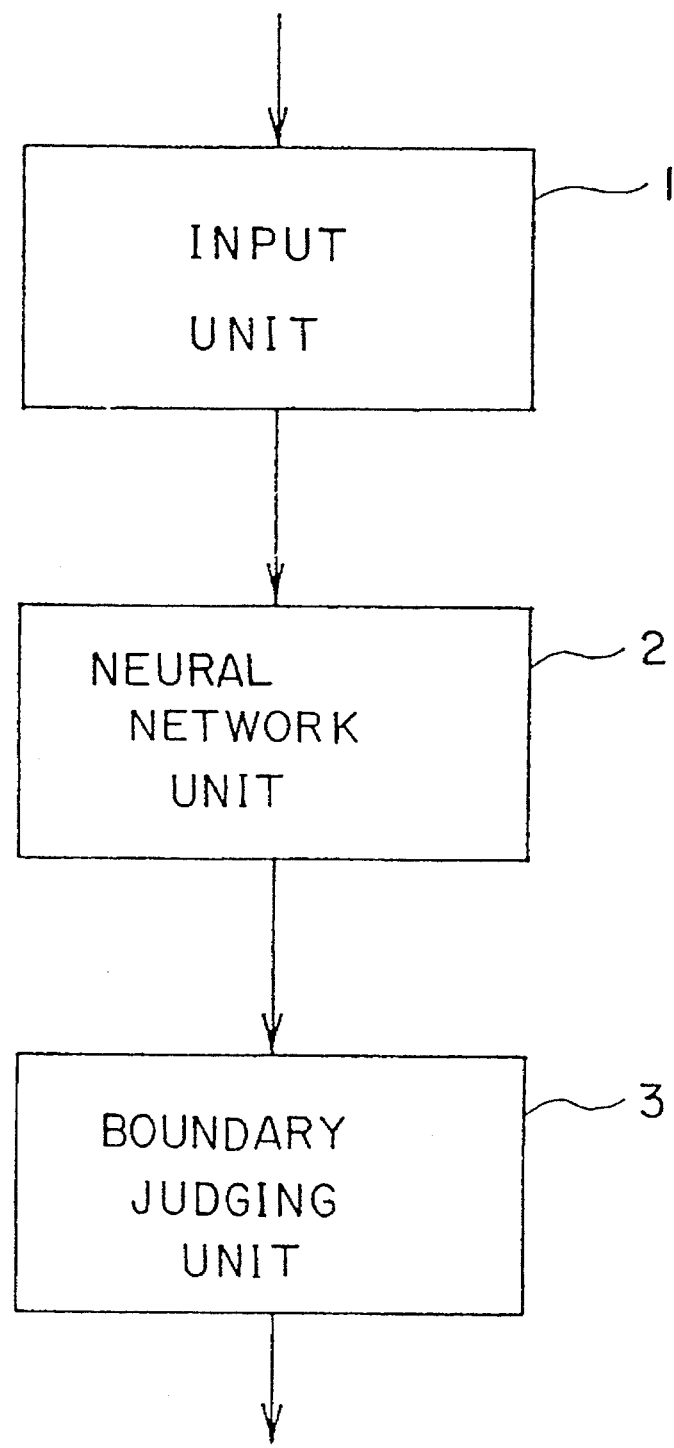
FIG. 1 is a block diagram of first and second principles of the invention.

FIG. 1 is a block diagram of a principle of the present invention. FIG. 1 designates a boundary extracting system for a sentence which extracts various boundaries before or after a word which forms sentence information.

FIG. 1 is a block diagram of a first principle of the invention for extracting the boundaries of clause and a phrase in a sentence. FIG. 1 is also a block diagram of the second principle of the invention for extracting boundaries of the subject and its predicate.

FIG. 1 illustrates performing classification of respective words forming input sentence information. The classification is performed by using a part-of-speech number previously defined.

Boundary position information outputting means 2 receives the result of the classification of a plurality of the words classified by the input word classification means 1 (for example, a part-of-speech number) and outputs the clause/phrase boundary position information for a plurality of words. This plurality of words comprise the previous n and following m words of the target word, namely, the word to be used for determining whether the boundary of the clause/phrase exists before or after the word. An input pattern corresponding to a part-of-speech number corresponding to these words is input to an input layer of the neural network in boundary position information outputting means 2. Respective units of the output layer provide position information of the boundary of the clause/phrase for the target word.

Boundary judging unit 3 outputs the result of the decision of a boundary of the clause/phrase for the target words to be used to judge whether the boundary of the clause/phrase exists before or after the word in a plurality of words.

Boundary judging means 3 comprises a threshold buffer and comparing unit, for example, and the outputs of respective units of the output layer in the neural network provided within the boundary position information output means 2 are respectively compared with a threshold value, thereby outputting the result of the comparison as a result of the judgment of the boundary of the clause/phrase.

According to the first principle of the invention, the input word classifying means 1 classifies respective words that form input sentence information by using a part-of-speech number. The result of this classification is input to t he neural network in the boundary position information output means 2 as the unit of a plurality of words. The plurality of words comprises a target word for use in judging whether the boundary exists before or after the word and the word on either side of the target word. The part-of-speech numbers for these three words are then input to the neural network.

The neural network previously learned a "teacher pattern" and a unit of the output layer outputs the boundary position information designating the clause boundary or the phrase boundary obtained from the input sentence data. The output layer is provided with a neuron corresponding to the clause boundary, noun phrase, verb phrase, prepositional phrase, and infinitive phrase, and when the output of any one neuron becomes 1, the boundary position information is output.

Boundary judging means 3 obtains the boundary of the clause/phrase and designates a starting position of the clause/phrase based on the boundary position information output by boundary position information (or data output means 2. Upon execution of the above described neural network, the output of the output layer unit need not always be "1". For example, if the output of the unit designating the boundary of the clause is 0.8, the output of the other units may become 0. The boundary judgment means 3 uses the boundary position information, including an ambiguity; a threshold value previously stored in a threshold value buffer is compared with the output value of the output unit and a position of the start of the clause/phrase which can be judged as most possible is determined as a boundary.

The second principle of the invention can also be understood from the block diagram in FIG. 1. The input unit 1 provides input number searching means to search for a word number previously associated with a word which forms the input sentence information. This search is performed by enabling the input unit to search a word dictionary.

The neural network 2 provides boundary position information output means for receiving the word numbers corresponding to a plurality of words, which are output by input word number searching means, then outputs boundary position information of the subject and predicate for a plurality of words. The boundary position information output means in both the first principle of the invention include a neural network and the output layer of the neural network outputs the boundary position information of the subject and predicate in the case of the second principle of the invention.

The boundary judgment means outputs the result of the judgment of the subject and predicate for the target word within a plurality of words in a manner similar to that of the first principle of the invention. The judgment is performed by comparing the output value of the output unit of the neural network with a threshold value as in the first principle of the invention.

As described above, in the present invention, the input word unit 1 may classify a part-of-speech number for a word, or search for an input word number. The information amount to be held by these means is small and it is not necessary to form a grammar rule based on linguistic knowledge, to extract the boundaries of the clause/phrase or the subject and predicate.

Figure 2:
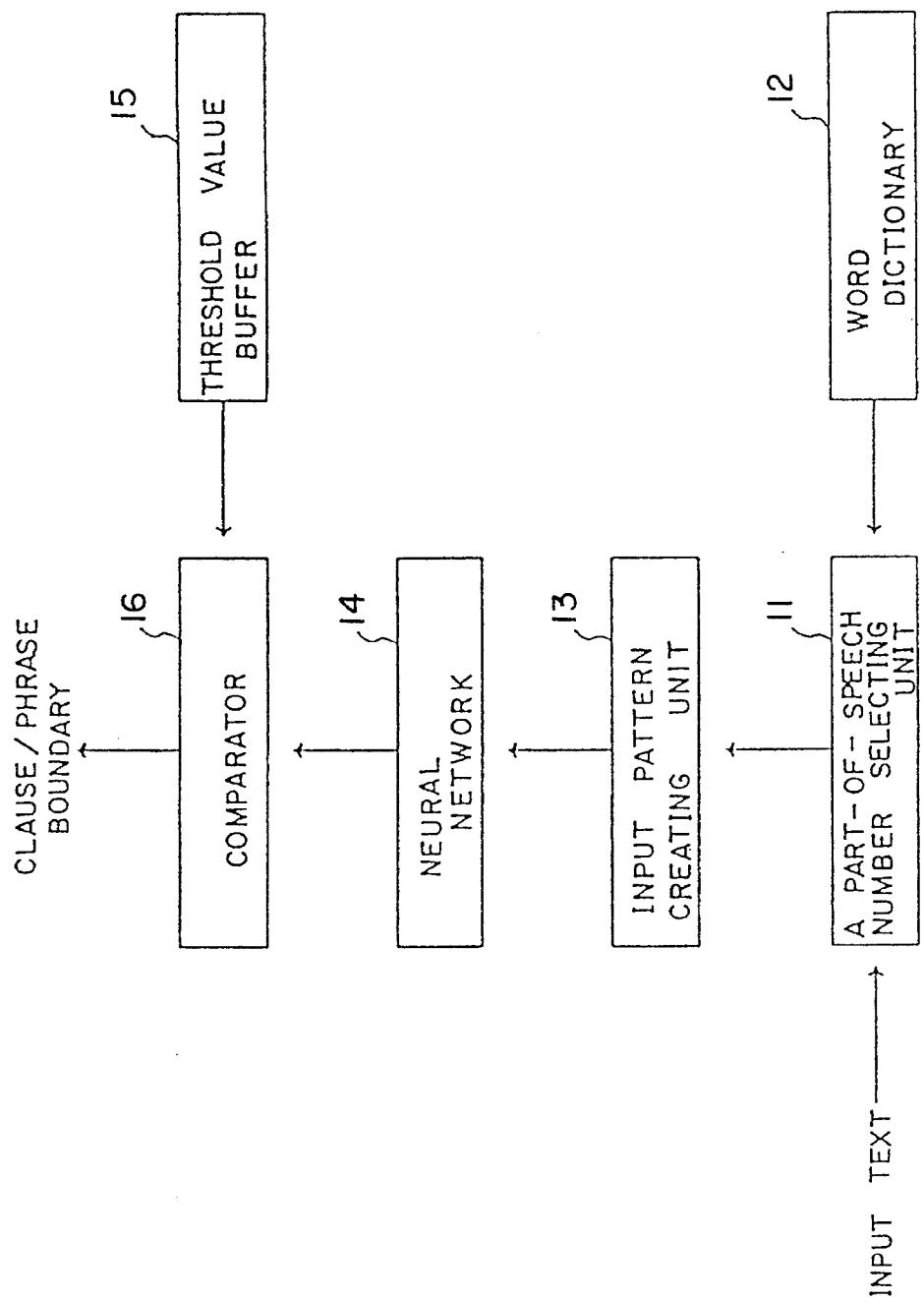
FIG. 2 is a block diagram of a basic structure of an embodiment according to the first principle of the invention.

FIG. 2 shows a block diagram of the basic structure of an embodiment according to the first principle of the invention. In FIG. 2, this embodiment comprises a part-of-speech number selecting unit 11 for selecting a part-of-speech number of respective words which forms the input text, a word dictionary 12 for storing a part of number for each word, an input pattern creating unit 13 for creating a pattern representing a list of numbers for a plurality of words as an input pattern to the later-described neural network, a neural network 14 with respective units in an input layer for receiving an input pattern output by the input pattern creating unit 13, a threshold value buffer 15 for storing a threshold value for the output from the respective unit in the output layer in the neural network 14, and a comparing unit 16 for comparing the output of the respective output layer unit of the neural network 14 with a content stored in the threshold value buffer 15.

In FIG. 2, a part-of-speech number selecting unit 11 selects a part-of-speech number of respective words which form the input text by searching the word dictionary 20 and outputs the selection result to the input pattern creating unit 13. The input pattern creating unit 13 forms a set comprising a particular word at the head of an input sentence and the word on either side of the particular word. A pattern representing a list of numbers for these three words is an input pattern to neural network 14. The input to the neural network 14 will be described later. The neural network 14 outputs the boundary position information from respective units of the output layer and the information is compared with the result stored in the threshold value buffer 15 by comparator 16. The result of the comparison is output as the clause/phrase boundary.

Figure 3:
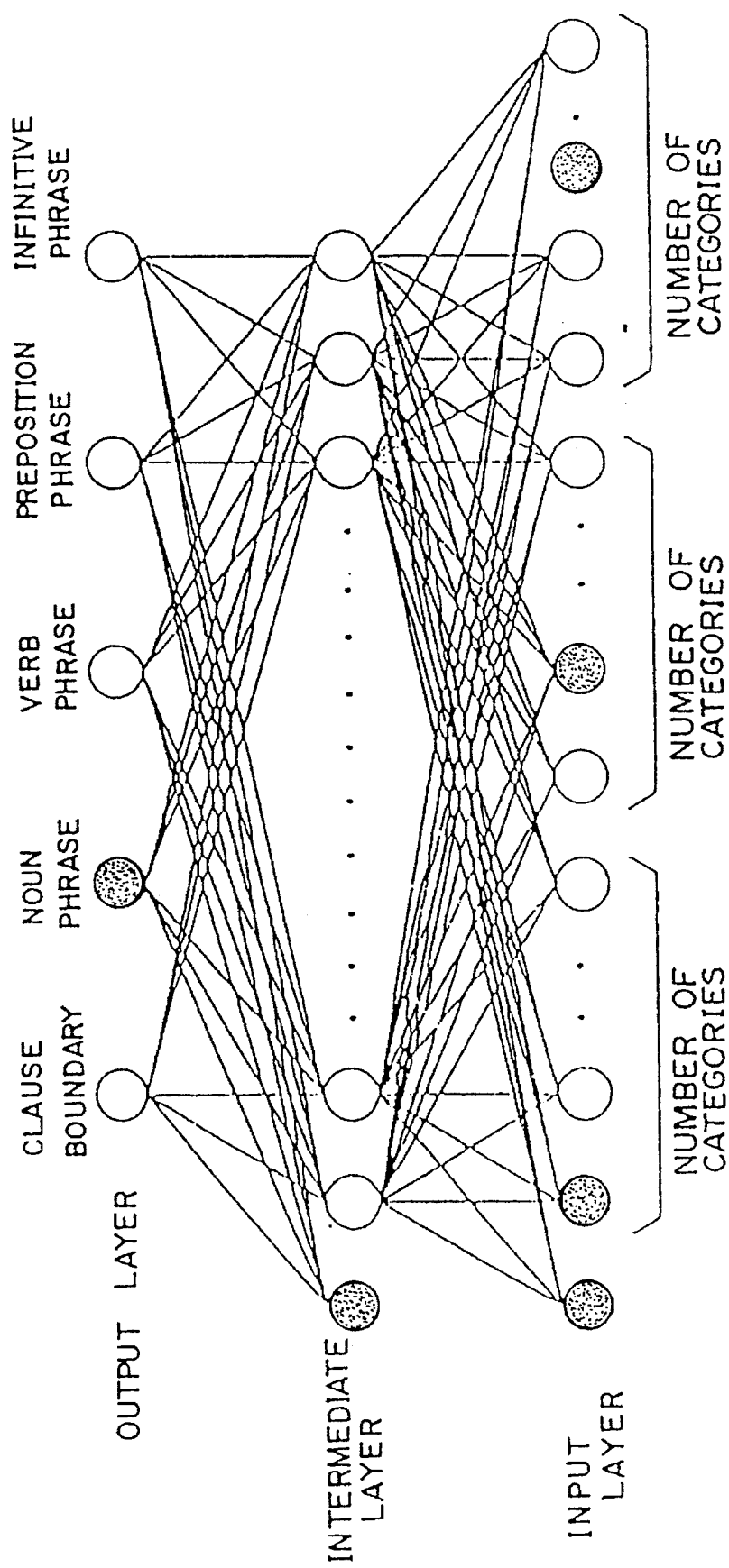
FIG. 3 is a structural diagram of an embodiment of a neural network/according to the first principle of the invention.

FIG. 3 shows an embodiment of the neural network according to the first principle of the invention. The neural network comprises three layers: an input layer, an intermediate layer, and an output layer. It can naturally use a neural network with a plurality of intermediate layers.

As explained by FIG. 2, the input provided to the input layer of the neural network 14 by input pattern creating unit 13 represents a part-of-speech number for three words comprising the particular word used in judging the boundary in the input sentence and the word on either side of the particular word. The input layer comprises 60 units representing three words times 20 which corresponds to the total part-of-speech numbers plus one threshold unit for providing threshold values to respective units in the intermediate layer as later described in FIG. 4. Thus, the total number of the input layer units is 61. During input, a 1 is provided to an input unit corresponding to a part-of-speech number of the word before the target word in each of the 20 units on the left-most side excluding the threshold value unit, and 0 is provided to the other units. Similarly, a 1 is provided to the unit corresponding to a part-of-speech for the target word in each of the middle 20 units and 0 is input to the other units. Further, a 1 is input to the unit corresponding to a part-of-speech number after the word in each of the 20 units on the right-most side and 0 is input to the other unit. Further, 5 units are provided in the output layer corresponding to the clause boundary, noun phrase, verb phrase, preposition phrase, and infinitive phrase. Any one output from these units becomes 1 and the output of respective units are provided to the comparator 16 shown in FIG. 2 as the boundary position information of the clause or phrase provided before or after the target word. Regarding the phrase corresponding to the unit in the output layer shown in FIG. 3, the noun phrase means, a phrase including a group of nouns (noun, pronoun, personal pronoun) forming the subject or object; the verb phrase means a phrase whose head comprises a verb, auxiliary verb, or adverb for modifying them; the preposition phrase means a preposition which exists at the head; and the infinitive phrase means a phrase in which the initial part is NOT or TO. The embodiment later explained does not extract a completion point of the verb phrase, preposition phrase, and infinitive phrase, but the completion point thereof may be extracted. Further in a field of natural language processing, the phrase is used as an upper concept of parts of speech and thus a phrase consisting of one word can exist.

FIG. 4 is an embodiment of the part-of-speech number classification stored in a word dictionary 12 in FIG. 2. The word dictionary 12 stores a part-of-speech number of a part of speech corresponding to the input word; the classification is shown in FIG. 4. In this classification, an adverb particle designated by a part-of-speech number 2 is a preposition such as "in", "on", and "back", and is combined with a verb and used in the manner of an adverb. The determiner designated by part-of-speech number 3 is an article (such as "a" and "the"), a designation for an infinite pronoun ( such as "that" and "some") used as an adjective or in the possessive case (such as "my" and "our") with a pronoun or noun.

FIGS. 5A–5D provide an example of learning data according to the first principle of the invention. FIG. 5A is an input English text for training a neural network. As shown in FIG. 5B, for the English text, a symbol indicating one of various boundaries which form the semantic delimitation is attached to the word forming the boundary, thereby providing a modified English text. As the boundary information for respective boundary symbols, the clause boundary is assigned 16, the noun phrase 8, the verb phrase 4, the preposition phrase 2, and the infinitive phrase 1, thereby assigning respective decimal numbers as the boundary information. These decimal numbers are converted to binary numbers and these binary numbers are provided to the output layer of the neural network shown in FIG. 3 as the teacher signal. For example, in the boundary information for the clause boundary of 16 the decimal number is converted to the binary number of "10000", thus the unit of the clause boundary which is the fifth unit from the right side in the output layer shown in FIG. 3 is assigned "1" and the other units are assigned "0". The boundary information corresponds to the output of the comparator unit 16 in FIG. 2.

FIG. 5C is a list showing the corresponding relationship between the part-of-speech information and the boundary information. In the first row, for example, "This", the first word of the English text shown in FIG. 5A, is a pronoun and forms the noun phrase, thus becoming the boundary symbol of the noun phrase corresponding to the binary information added before this word.

FIG. 5D shows the correspondence between a part-of-speech set and the boundary information, namely, the learning data. In the first row, the above described "this" is a target word and part-of-speech numbers 19, 5, and 11 of three words including the target word and the words before and after the target are set. Then the corresponding boundary information is provided to the output layer units as "teacher data". Namely, in FIG. 3, out of 16 units corresponding to the part-of-speech number of the input layer units, a "1" is input to the unit corresponding to the part-of-speech number 19 out of 20 units on the left-most input, a "1" is input to the units corresponding to the part-of-speech number 5 out of 20 units in the middle inputs, a "1" is input to the unit corresponding to the part-of-speech number 11 out of 20 units on the right-most inputs and all the other units receive "0". The binary number obtained by converting the boundary information is input to respective units as "01000". The fourth unit from the right, i.e., the unit corresponding to the noun phrase outputs 1 and all the other units output 0. Then a learning of the weight and the threshold values in the neural network is performed by a back-propagation method.

Figure 6:
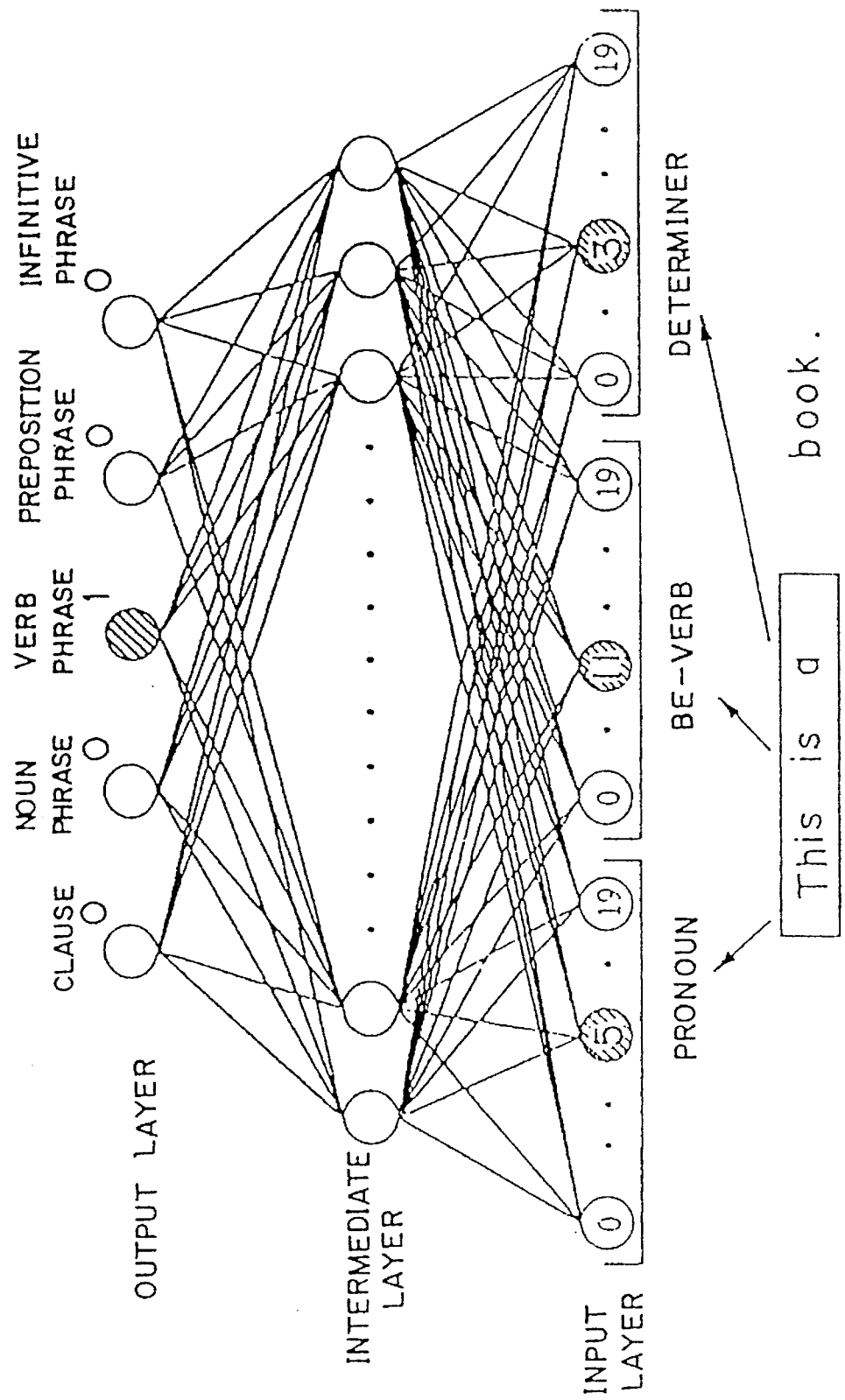
FIG. 6 is an example of a first part of learning by a neural network according to the first principle of the invention.
Figure 7:
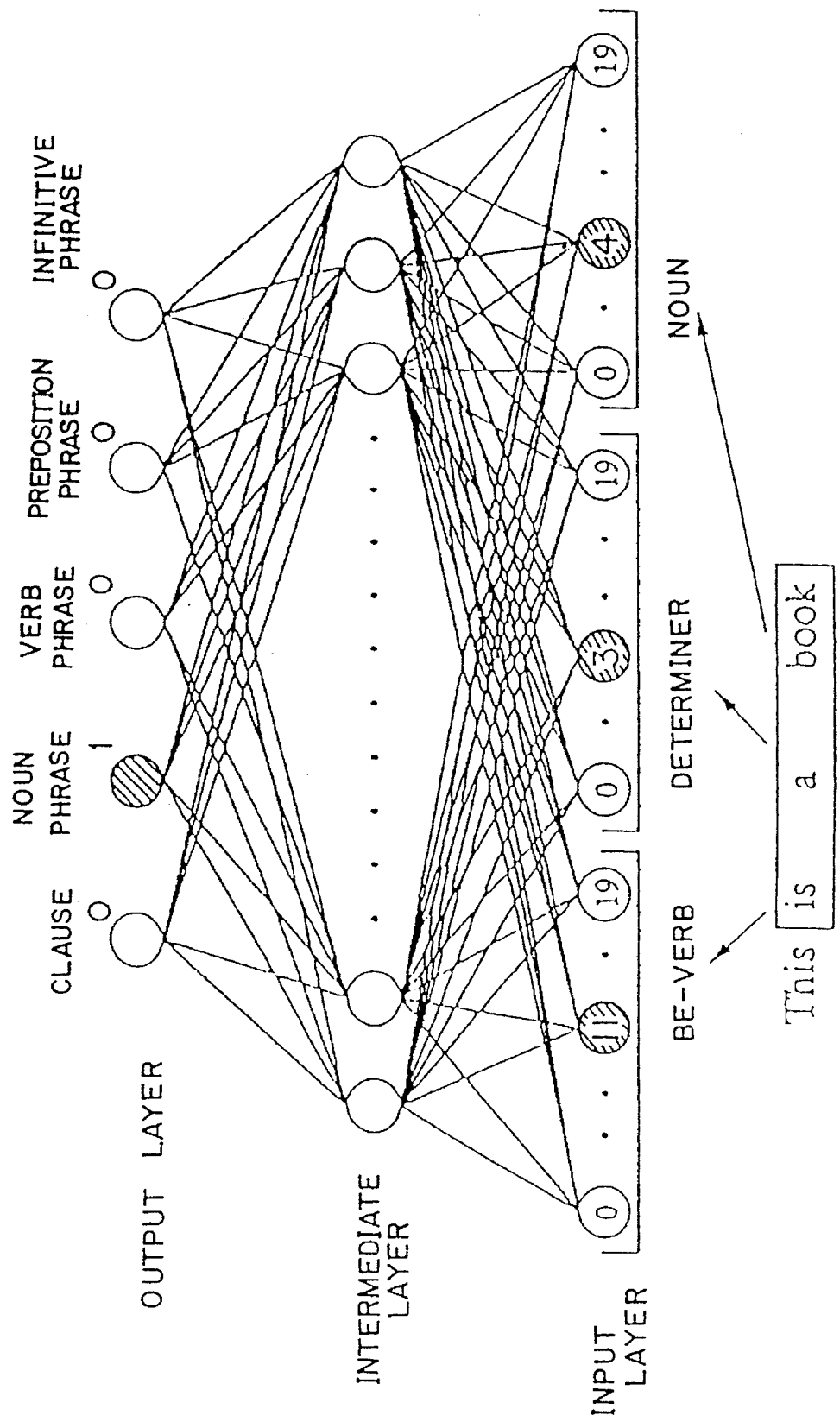
FIG. 7 is an example of a second part of learning by a neural network according to the first principle of the invention.

FIGS. 6 and 7 are an embodiment of a learning operation by this neural network. FIG. 6 shows that a set of the part-of-speech numbers for respective words "This is a" in the first row of the English text shown in FIG. 5A is provided to the input layer and that the boundary information of "00100" is provided to the output layer as the teacher data for 5, 11, and 3 in the second row in FIG. 5D. FIG. 7 shows a case in which the learning data shown in the third row in FIG. 5D are provided, namely, when "a" becomes a target word, the unit corresponding to the part-of-speech number 11, 3, and 4 in the input layer respectively input 1 and the boundary information 8 for the output layer unit, namely, "01000" is provided as the teacher pattern.

In FIGS. 6 and 7, the threshold unit provided at the left-most side of the input layer and intermediate layer in the neural network shown in FIG. 3 is omitted. For example, "1" is input to these threshold units and the weights of the connection to the respective units of the following layer are input to the respective units in the following layer as the threshold value. Upon performing the learning, the weight is changed by back-propagation and thus the threshold value is learned. However, the threshold value unit is not directly relevant to the present invention.

Figure 8:
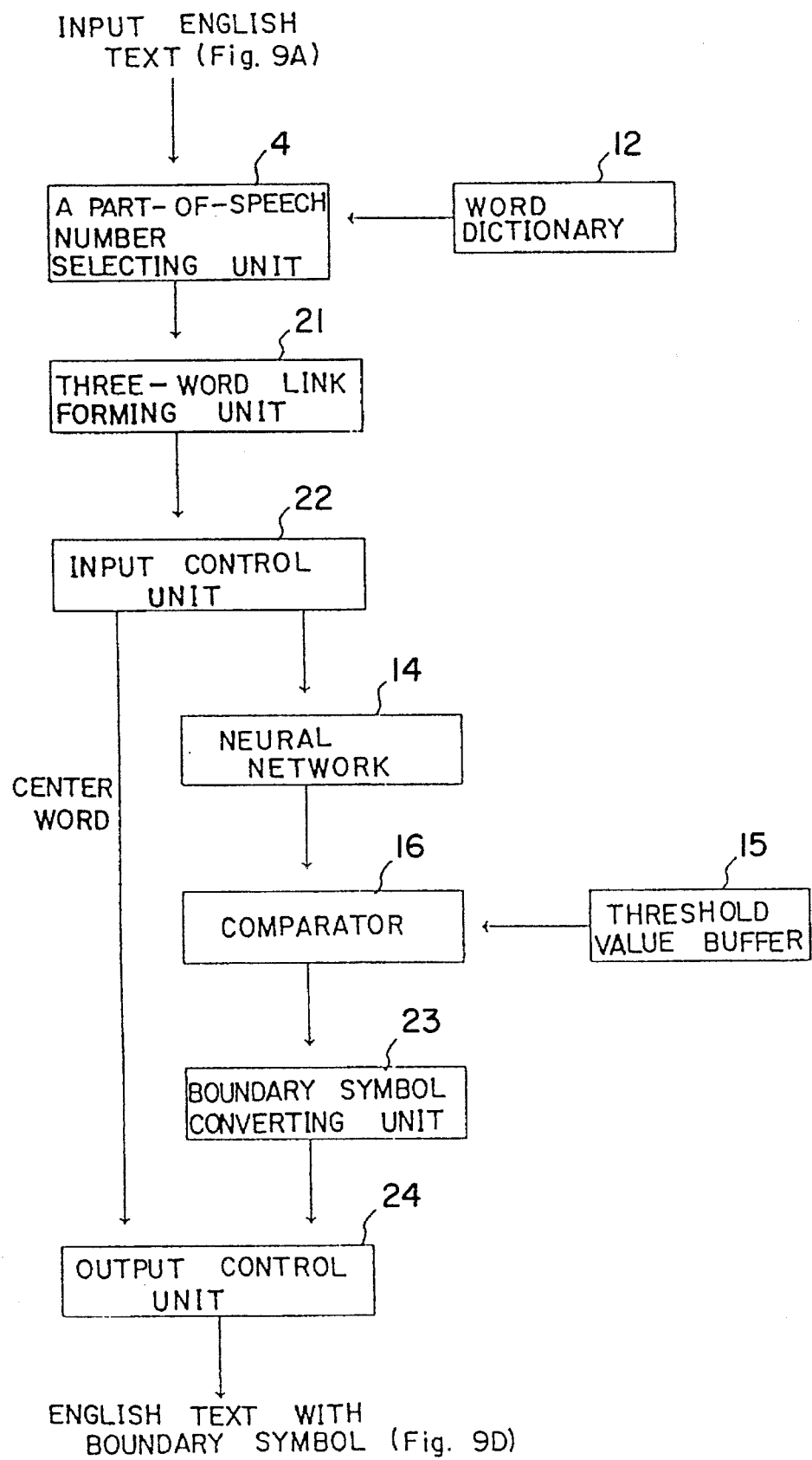
FIG. 8 is a block diagram of a detailed structure of an embodiment according to the first principle of the invention.

FIG. 8 is a block diagram of a detailed structure of an embodiment according to the first principle of the invention. FIG. 8 is different from the basic structure shown in FIG. 2 in that the input pattern creation unit 13 is divided into three word link forming unit 21 and input control unit 22. The boundary symbol converting unit 23 and the output control unit 24 are provided at the following stage of the comparing unit 16.

Three word link forming unit 21 sets part-of-speech numbers for parts of speech for three words in total comprising a target word whose boundary is judged regarding clause/phrase and the words on either side of the target word as the three word link, then outputs the three word link to input control unit 22. Input control unit 22 outputs an input pattern corresponding to a part of number of the three word link to the input layer unit and simultaneously outputs the word corresponding to the center of the three word link, namely, the word whose boundary is to be judged as the center word.

Boundary symbol converting unit 23 receives the results of the comparison by comparing unit 16, namely, the number of the unit whose output exceeds the threshold value, out of the layer of the neural network 14 as the binary number, then converts the binary number to the decimal number to output the boundary symbol corresponding to the boundary information to output control unit 24. First, the output control unit 24 outputs the boundary symbol input from the boundary symbol converting unit 23 and outputs the center word received from the input control unit 22 next, namely the target word. The part-of-speech selecting unit 11 to the output control unit 24 executes a series of processes with regard to all the words in the input text and thus provides the English text to which the boundary symbol is attached, namely, the English text shown in FIG. 9B which is described later.

FIGS. 9A–9D provide an example of the clause/phrase boundary extraction according to the first principle invention. FIG. 9A is the input English text. The first row of the English text is the same as the first row of the English text of the learning data shown in FIG. 5, but the second row and the following rows are different from the first row of the English text shown in FIG. 5. The neural network performs a learning operation using the English text shown in FIG. 5A and can extract an appropriate clause/phrase boundary with regard to the English text in the second and following rows of FIG. 9A, thus achieving the capability of generalization.

FIG. 9B shows the results of selecting part-of-speech numbers, that is, the selection result of part-of-speech selector 11. FIG. 9C shows the result of generating a three-word-sequence by the three-word-sequence generator 21. This corresponds to a set of three left-most part-of-speech numbers shown in FIG. 5D.

FIG. 9D shows the output result by the output controller 24 shown in FIG. 8. This means that each three-word-sequence shown in FIG. 9C inputted through the input controller 22 to the corresponding output layer of the neural network 14 is compared by the comparator 16 with the threshold 0.5, for example, stored in the threshold buffer 15. The output of each unit is applied to the boundary sign converter 23 as 1 if it is larger than the threshold, the corresponding boundary sign is outputted to the output controller 24; and the boundary sign is added immediately before the central word provided by the input controller 22, thus indicating the output result. In the output results, "he" in the middle of the third line, for example, is preceded by both clause and noun phrase boundary signs. This means that clause and noun phrase boundaries exist immediately before the word. Additionally, this means that the output values of two units in the output layer exceed the threshold.

Figure 10:
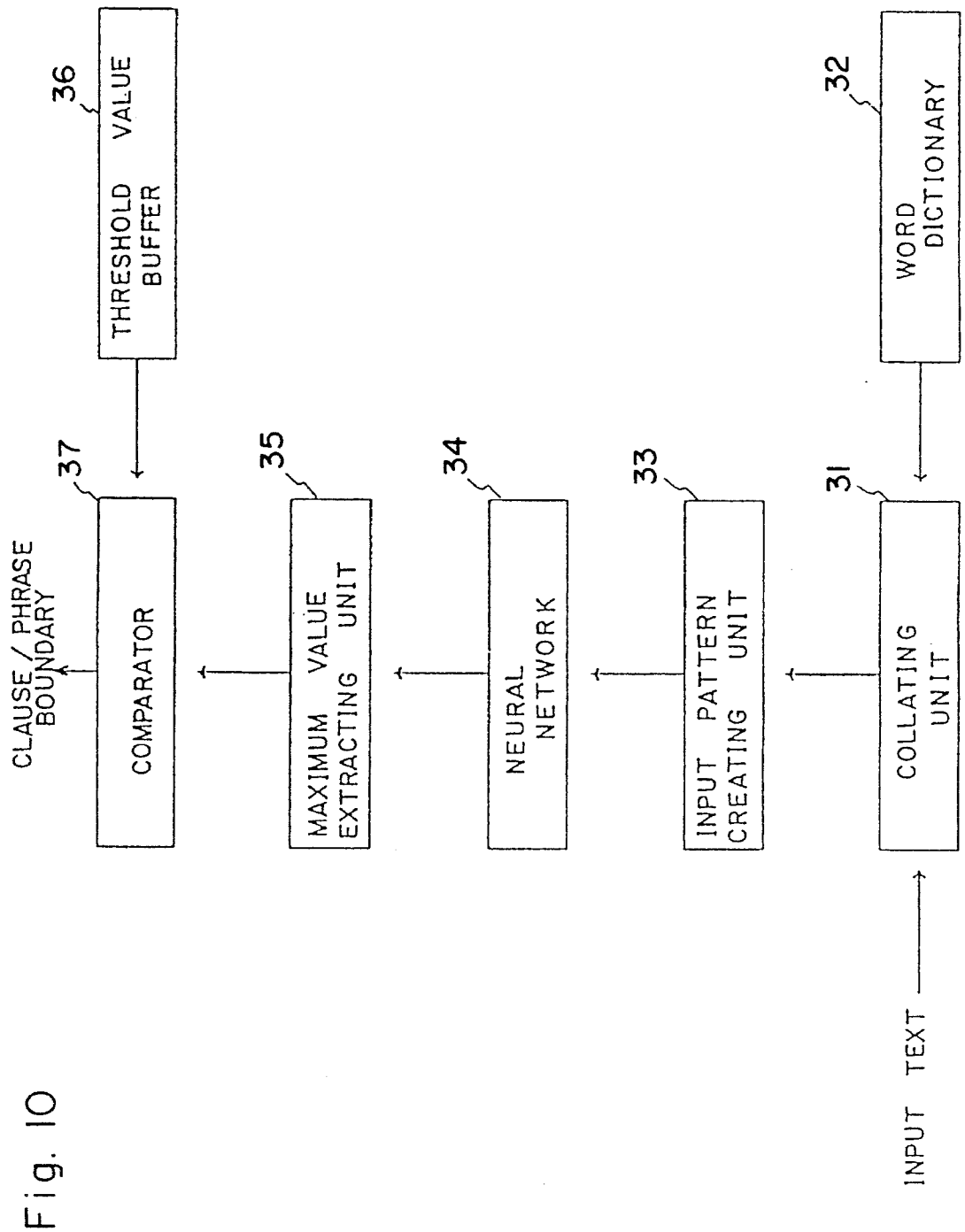
FIG. 10 is a block diagram for a structure of an embodiment according to the second principle of the invention.

FIG. 10 is a block diagram of a basic configuration of an embodiment of the second principle of the invention. In the second principle of the invention, a boundary between a subject and a predicate is extracted in inputted text.

In FIG. 10, the embodiment includes a collating unit 31 for retrieving a word number of each word which forms the inputted text; a word dictionary 32 for storing word numbers; an input pattern generator 33 for applying, with the output of the collating unit, to the input layer of a neural network 34 an input pattern comprising word numbers of a plurality of words; a neural network 34; a maximum value extractor 35 for extracting the maximum value among the output of units in the output layer of the neural network 34; and a comparator 37 for comparing the output of the maximum value extractor 35 with a threshold stored in a threshold buffer 36 and outputting the comparison result as subject-predicate boundary information.

The second principle works efficiently for text comprising comparatively smaller number of words. In the second principle, each word in inputted text is represented as a word number, i.e., one number corresponds to one word. In the present embodiment, a four-word-sequence comprising a target word which is checked whether or not a subject-predicate boundary exists, one word preceding the target word, and two words following the target word are generated. Word numbers for these four words are applied to the neural network 34 as a four-word-sequence.

Figure 11:
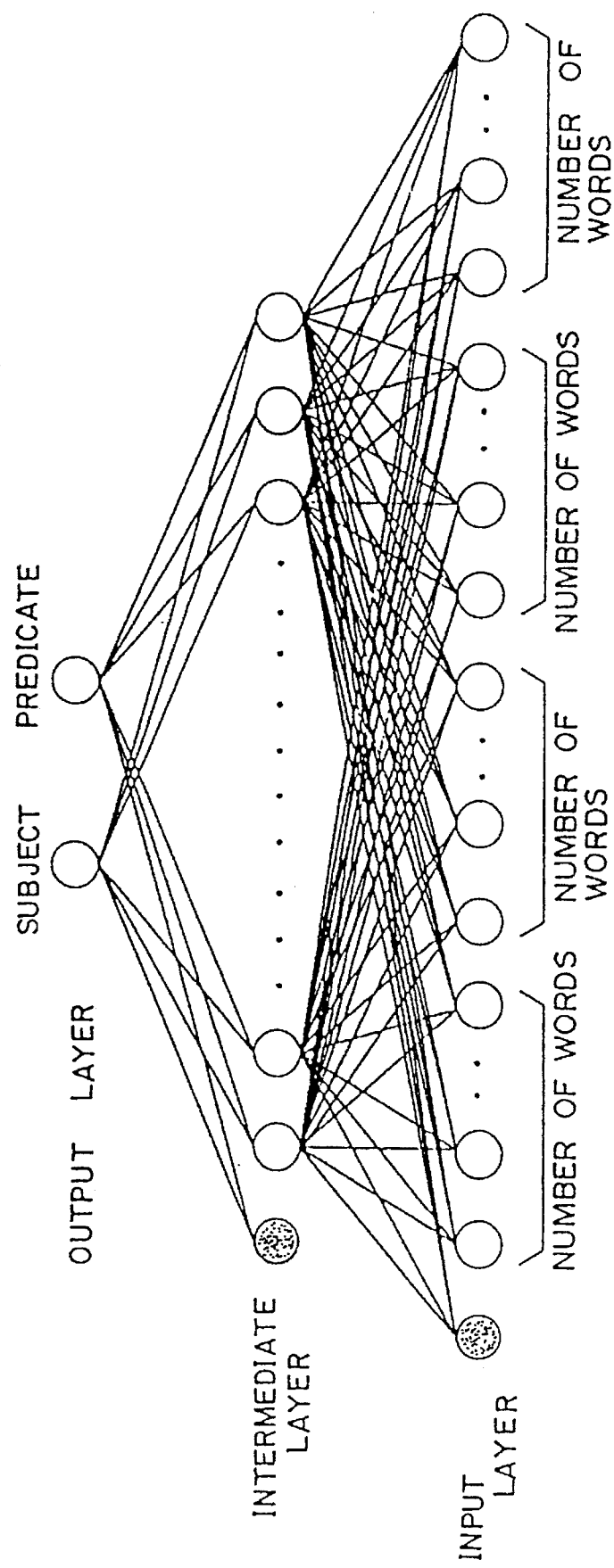
FIG. 11 is a structural diagram of an embodiment of a neural network according to the second principle of the invention.

FIG. 11 shows an embodiment of a neural network of the second principle. In FIG. 11, the neural network is a three-layer network, and can comprise a plurality of intermediate layers if necessary. In the input layer, there are a threshold unit and units indicating respective word numbers corresponding to words in a four-word-sequence. In an example illustrated in FIG. 14 described later, a total of 10 words are provided, and the number of units of the input layer is 41 in all. The output layer comprises two units each corresponding to a subject and a predicate, and the change in the output of the output layer units is extracted as a boundary as described later.

Figure 12:
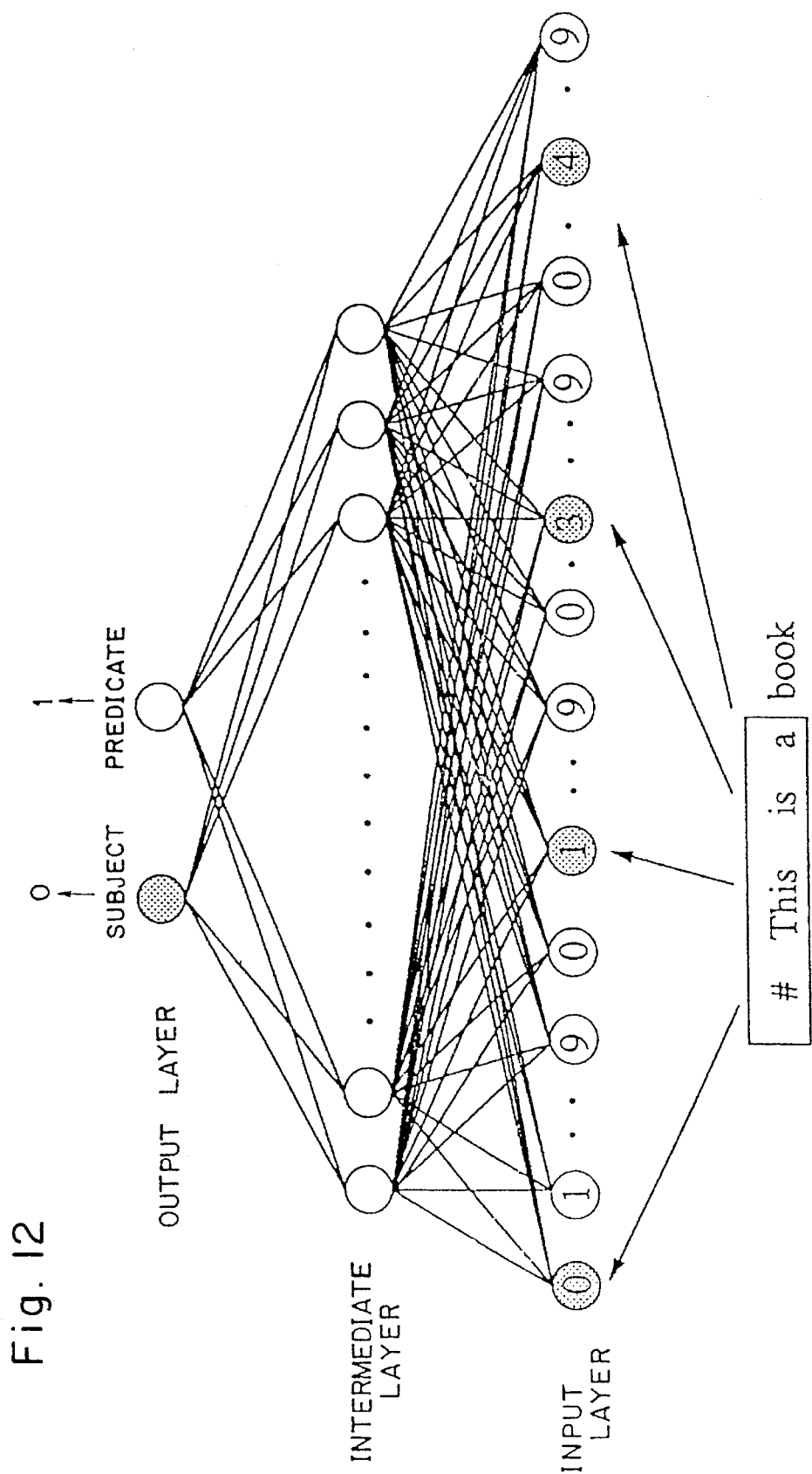
FIG. 12 is a drawing of an embodiment of an operation of the neural network according to the second principle of the invention.

FIG. 12 shows an embodiment of the operation of the neural network of the second principle. In FIG. 12, the English text "This is a book." is inputted, and the information indicating whether the first word "This" is a subject or a predicate is outputted from a unit in the output layer. That is, "This", one word prior to "This" (since "This" is the first word, one word prior to "This" is "#" that indicates the start of the sentence), and two words following "This" ("is" and "a") form a four-word-sequence. Each unit corresponding to a respective part-of-speech number in these four words as shown in FIG. 11 is assigned 1 (the word numbers are obtained as described with reference to FIG. 14) and other units are assigned 0. The output of a unit corresponding to a subject among units in the output layer is assigned 1, and the output of a unit corresponding to a predicate is assigned 0. Thus, the target word "This" is indicated as the subject of the sentence. In FIG. 12, a unit corresponding to a subject is assigned 1, and a unit corresponding to a predicate is assigned 0 as a unit number of the output layer.

Figure 13:
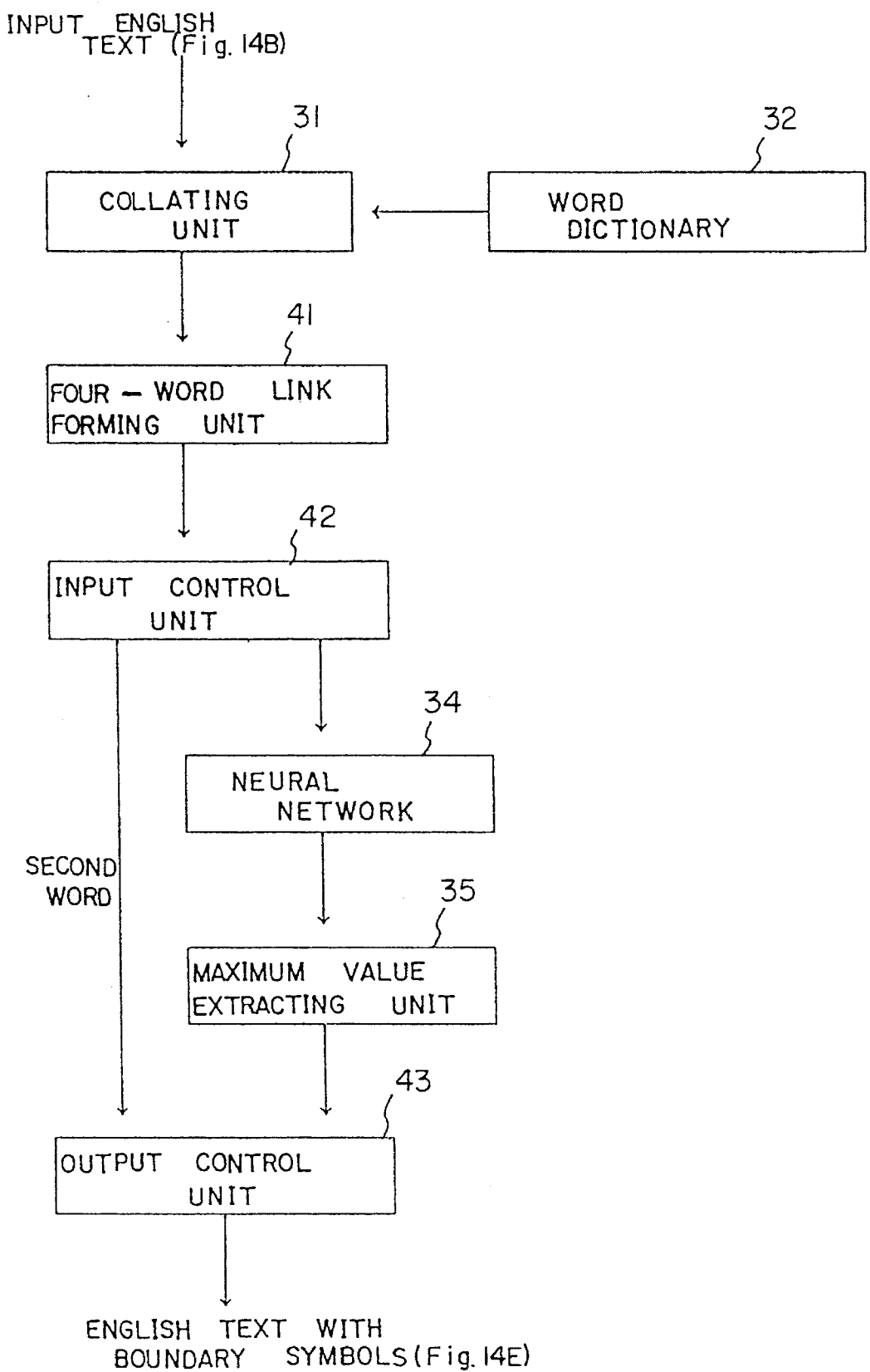
FIG. 13 is a block diagram of a detailed structure of an embodiment according to the second principle of the invention.

FIG. 13 shows a detailed configuration of the second principle. In comparison with the basic configuration shown in FIG. 10, an input pattern generator 33 is divided into a four-word-sequence generator 41 and an input controller 42 and an output controller 43 includes the comparator 37 illustrated in FIG. 10.

In FIG. 13, the four-word-sequence generator 41 generates, with the output of the collating unit 31, a four-word-sequence comprising four word numbers respectively corresponding to a target word, one preceding word, and two following words, and outputs the sequence to the input controller 42. The input controller 42 generates an input pattern to be applied to the neural network 34 according to part-of-speech numbers as a four-word-sequence, and outputs a target word, that is, the second word to the output controller 43. The output controller 43 outputs a boundary between a subject and a predicate in the inputted text according to the output of the comparator and the second word provided by the input controller 42; for example, the output is given with an underline as shown in FIG. 14E.

FIGS. 14A–14F show an example of the extraction of a boundary between a subject and a predicate according to the second principle of the invention. FIG. 14A shows a set of word numbers, that is, a vocabulary set of words in inputted English text; and FIG. 14B shows the inputted English text.

For the inputted English text, the collating unit 31 in FIG. 13 retrieves the word dictionary 32; the selection result of word numbers is given as shown in FIG. 14C; and the four-word-sequence generator 41 generates, with these word numbers, a four-word-sequence of word numbers comprised of the numbers of a target word, one preceding word, and two following words as shown in FIG. 14D. In this embodiment, however, words are sequentially inputted starting with the last word. That is, the first line of the generation result is comprised of the word number 6 corresponding to "book", the word number 8 corresponding to the terminator period, and two word numbers 0 as the third and fourth numbers in the sequence.

FIG. 14F shows the correspondence of the input to the input layer units of the neural network 34 shown in FIG. 13 to the numbers of active units of the output layer. The input to the input layer units indicates word numbers corresponding to units assigned 1 in the units corresponding to respective words in a four-word-sequence as shown in FIGS. 11 and 12. Active unit numbers in the output layer refer to numbers assigned to output layer units as described in FIG. 12. For example, an active unit number 1 of the output layer for the input 6800 in the first line indicates that the active unit number 1 for the target word; that is, a period is 1, thus indicating the period forms a part of the predicate. The unit number turns to 0 from 1 between the fourth and fifth lines, indicating that a subject-predicate boundary exists there between "is" and "this". The result is outputted by the output controller 43 as shown in FIG. 14E with the predicate part underlined.

FIGS. 15A and 15B are an explanatory view of another embodiment of extracting a subject-predicate boundary. In FIGS. 14A–14F, the generation result of a four-word-sequence is inputted sequentially to a neural network starting with the last word of inputted English text. In FIGS. 15A and 15B, however, words are sequentially inputted starting with the first word of inputted English text. In FIGS. 15A and 15B, as in FIG. 14F, the correspondence of the word number, whose input to the corresponding unit in the input layer units is 1, to the active unit number in the output layer in response to the above described input is indicated for each target word. However, an active unit number in the output layer units is represented as a decimal number converted from a binary number representing the position of an output layer unit as shown in FIGS. 6 and 7. In the last column of FIG. 15B, the active unit number 2 shows that a unit in the output layer corresponding to a subject becomes active; 1 shows that a unit corresponding to a predicate becomes active and 0 shows that neither of these units becomes active.

In the above described embodiment, inputted text is written in English and words are classified in part-of-speech number or word number. Likewise, in other languages, a boundary between a subject and a predicate, phrases, or clauses can be extracted easily by using parts of speech specific to a language itself. The above described verb, preposition, and infinitive, etc. respectively include a verb phrase, a phrase led by a preposition, and a phrase including an infinitive. This is not limited to English grammar, but the part-of-speech classifying method can be adopted also in classifying engineering matters. Besides, in the above examples, a three-word-sequence can also be used for extracting a clause boundary to improve efficiency.

As described above, in the present invention, a clause/phrase boundary can be extracted by preparing a simple dictionary describing parts of speech, etc. Words can be classified in word number without using parts of speech, etc. Therefore, the present invention permits extracting a boundary as a semantic delimitation in a sentence comprising word sets in a large vocabulary such as a general natural language. Furthermore, a boundary indicating the semantic delimitation, that is, a boundary between a subject and a predicate, for example, in a sentence comprising word sets in a small vocabulary can be extracted. Using this technology, a natural synthesized voice can be generated in a synthesized voice response system, etc.

Also, the present invention realizes the extraction of a clause/phrase boundary without grammatical rules based on linguistic knowledge, thus allowing for miniaturization of a system with no need of a memory for grammatical rules.

The embodiment of the present invention is thus explained in detail. In the embodiments of the first and second principles, the words are classified by using part-of-speech numbers and word numbers of English words. Likewise, in other languages, a clause/phrase boundary or a subject/predicate boundary can be easily extracted using respective parts of speech and the corresponding numbers. The above described verb, preposition, infinitive, etc. also include a phrase containing a verb, a phrase led by a preposition, and a phrase containing an infinitive respectively. This is not limited to English grammar, but the part-of-speech classifying method can be adopted also in classifying engineering matters.

In the above examples, a three-word-sequence or a four-word-sequence is used; however, a five-word-sequence can also be used for extracting a clause boundary to improve efficiency.

What is claimed is:

1. An intra-sentence boundary extracting system for extracting a boundary in a structure of a sentence located either before or after a target word included in words forming inputted sentence data, said system comprising:

inputted word classifying means for classifying a first number of words forming the inputted sentence data to produce an input pattern indicating a second number of classification results of the words; and boundary position data output means for receiving the classification results from said inputted word classifying means and for outputting at least one of clause and phrase boundary position data, said boundary position data output means including a neural network formed of an input layer having a third number of units, each unit coupled to said inputted word classifying means to receive each part of the input pattern for the first number of words including the target word, n preceding words before the target word and m succeeding words after the target word, where n and m are at least one, the third number corresponding to the first number times the second number of classification results of the words;

more than one intermediate layer coupled to said input layer; and an output layer, coupled to at least one of said more than one intermediate layer, to output the boundary position data on the structure of the sentence, corresponding to a boundary of at least one of a clause, a noun phrase, a verb phrase, a preposition phrase and an infinitive phrase either before or after the target word.

2. An intra-sentence boundary extracting system according to claim 1, further comprising:

boundary determining means for outputting a boundary determination result for the target word based on the boundary position data outputted by said boundary position data output means 3. An intra-sentence boundary extracting system according to claim 2, wherein said boundary determining means comprises:

a comparing unit, operatively connected to said boundary position information output means, for comparing the classification results output by said inputted word classifying means with a predetermined threshold, and then outputting a comparison result as a boundary determination result for the target word.

4. An intra-sentence boundary extracting system according to claim 3, further comprising:

a boundary sign converting unit operatively connected to receive the comparison result from said comparing unit, for outputting, using the comparison result output by said comparing unit, a boundary sign for the target word; and an output control unit, operatively connected to said boundary position data output means to receive the target word and to said boundary sign converting unit, to add the boundary sign outputted by said boundary sign converting unit to the target word, and to output sentence data with the boundary sign.

5. An intra-sentence boundary extracting system according to claim 1, wherein said inputted word classifying means comprises:

a word dictionary for storing part-of-speech numbers representing respective parts of speech; and a part-of-speech number selecting unit for selecting and using from said word dictionary, each part-of-speech number representing one of the words forming the inputted sentence data, and then outputting the part-of-speech number as the classification results for each of the words.

6. An intra-sentence boundary extracting system according to claim 1, wherein said boundary position data output means further comprises an input pattern generating unit, operatively connected to said neural network and said inputted word classifying means, to generate in response to operation of said neural network, the input pattern using the classification results output by said inputted word classifying means.

7. An intra-sentence boundary extracting system according to claim 6, wherein said input pattern generating unit comprises:

a word sequence generating unit, operatively connected to said inputted word classifying means, for generating a word-sequence as a sequence of part-of-speech numbers of the n preceding words, the target word and the m succeeding words; and an input control unit, operatively connected to said word sequence generating unit and said neural network, for outputting the input pattern to said neural network using the word-sequence output by said word sequence generating unit.

8. An intra-sentence boundary extracting system for extracting a boundary either before or after a word included in a sentence data, said system comprising:

inputted word number retrieving means for receiving inputted sentence data and for retrieving a word number of a target word included in the inputted sentence data;

boundary position data output means for receiving each word number retrieved by said inputted word number retrieving means and for outputting boundary position data, said boundary position data output means including a neural network formed of an input layer having a first number of units, each unit coupled to said inputted word number retrieving means to receive each word number in an input pattern representing a second number of words including the target word, n preceding words before the target word and m succeeding words after the target word, where n and m are at least one, the first number being equal to the second number times a third number of possible word numbers;

more than one intermediate layer coupled to said input layer; and an output layer, coupled to at least one of said more than one intermediate layer, to output the boundary position data indicating a boundary either before or after the target word depending on whether the target word is a subject or a verb; and boundary determining means for outputting, according to the boundary position data outputted by said boundary position data output means, a boundary determination result for the target word.

9. An intra-sentence boundary extracting system according to claim 8, wherein said inputted word number retrieving means comprises:

a word dictionary for storing word numbers corresponding one-to-one to dictionary words, a collating unit for selecting, from said word dictionary, a corresponding word number and outputting the corresponding word number as a retrieval result for each word in the inputted sentence data.

10. An intra-sentence boundary extracting system according to claim 8, wherein said boundary position data output means comprises:

a maximum value extracting unit, operatively connected to said neural network, for extracting a maximum value of the boundary position data output by the output layer of said neural network; and an input pattern generating unit, operatively connected to said inputted word number retrieving means and said neural network, for generating, in response to operation of said neural network, the input pattern using the word numbers output by said inputted word number retrieving means.

11. An intra-sentence boundary extracting system according to claim 10, wherein said input pattern generating unit comprises:

a word sequence generating unit, operatively connected to said inputted word classifying means, for generating as a word-sequence the n preceding words, the target word and the m succeeding words; and an input control unit, operatively connected to said word sequence generating unit and said neural network, for outputting the input pattern to said neural network using the word-sequence output by said word sequence generating unit.

12. An intra-sentence boundary extracting system according to claim 8, wherein said boundary determining means comprises:

a comparing unit, operatively connected to said boundary position data output means, for comparing the boundary position data output by said boundary position data output means with a predetermined threshold and for outputting a comparison result as the boundary determination result for the target word.

13. An intra-sentence boundary extracting system according to claim 8, wherein words represented by the sentence data are sequentially inputted to said inputted word number retrieving means, starting with one of a first and a last word represented by the sentence data.

* * * * *

UNITED STATES PATENT AND TRADEMARK OFFICE
CERTIFICATE OF CORRECTION

PATENT NO. : 5,479,563

DATED : December 26, 1995

INVENTOR(S) : Yukiko YAMAGUCHI

It is certified that error appears in the above-indentified patent and that said Letters Patent is hereby corrected as shown below:

Column 1, line 67, delete line in its entirety.

Column 2, line 4, delete "network/" should be –network–;

line 8, after "FIGS." insert –5A, –;

line 18, "FIG." should be –FIGS.–;

line 49, delete "the" and insert –a– therein.

Column 3, line 40, after "data" insert –)–.

Column 4, line 13, after "knowledge" delete ",".

Column 5, line 5, "unit" should be –units–; and line 13, after "means" delete ",".

UNITED STATES PATENT AND TRADEMARK OFFICE
CERTIFICATE OF CORRECTION

Page 2 of 2

PATENT NO. : 5,479,563
DATED : December 26, 1995
INVENTOR(S) : Yukiko Yamaguchi

It is certified that error appears in the above-indentified patent and that said Letters Patent is hereby corrected as shown below:

Column 6, line 7, after "information" insert --8--.

Signed and Sealed this

Ninth Day of April, 1996

Attest:

BRUCE LEHMAN

Attesting Officer

Commissioner of Patents and Trademarks